Patented Oct. 30, 1951

2,573,420

UNITED STATES PATENT OFFICE 2,573,420

SUBSTITUTED CARBAMIC ACID ESTERS

Kurt Engel, Basel, and Charles J. Morel, Arlesheim, Switzerland, assignors to J. R. Geigy A. G., Basel, Switzerland, a Swiss firm No Drawing. Application November 3, 1950, Serial No. 194,042. In Switzerland November 23, 1949

3 Claims. (Cl. 260—471)

This invention is concerned with the production of new substituted carbamic acid esters of the general formula:

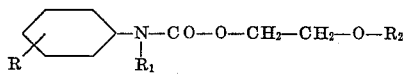

wherein
R represents hydrogen, low alkyl or alkoxy groups or halogen,
$R_1$ represents a methyl or ethyl group, and
$R_2$ represents a methyl; ethyl or a propyl group.

It has now been found that these compounds possess an excellent insect repellant action. As they also do not irritate the skin and have no toxic effect, they are suitable as insect repellants, if desired in combination with substances which have a similar action such as solvents or ointment bases etc.

The new compounds can be produced in various ways. A reactive derivative of a carbonic acid alkoxyethyl half ester, particularly a carbonic acid alkoxyethyl ester halide, can be reacted with an amine of the general formula:

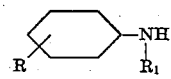

wherein R and $R_1$ have the meaning given above. Further, a bis-(alkoxyethyl)-carbonate or a phenyl-alkoxyethyl carbonate can be reacted with an amine of the above formula. Also, the amine can be heated with a carbamic acid alkoxyethyl ester.

Also, a reactive derivative of a carbamic acid derived from an amine of the above mentioned general formula, in particular a halide but also an alkylester can be used, can be reacted with an alcohol of the general formula:

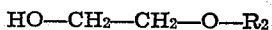

wherein $R_2$ has the meaning given above.

The reactions, by which one component is an acid halide, are most advantageously performed at a raised temperature in indifferent organic solvents such as benzene, toluene, xylene, acetone or chlorinated hydrocarbons. For this purpose acid binding agents such as soda or potash are added. On the reaction with carbonic acid ester halide, a second mol of the base used can serve as acid binding agent. On the other hand, particularly on reacting with carbamic acid halides, also the previous conversion of the second reaction component, here of the alkoxyethyl alcohol, into its salt, for example by means of sodium or sodium amide, comes into question instead of the use of an acid binding agent. Finally, instead of the above named indifferent solvents, those of an acid binding nature such as pyridine or dimethyl aniline can be used.

An excess of carbonic acid diester or alkoxyethyl alcohol or also one of the above named indifferent solvents which has a high boiling point can be used as solvent for reactions of amines and carbonic acid diesters or also carbamic acid esters and alkoxyalkyl alcohols. The reaction can be accelerated by the addition of a small amount of sodium or sodium alcoholate as condensing agent.

The carbonic acid ester halide or also carbonic acid diester of alkoxyethyl alcohols used as starting products for the first general process are obtained, for example, by the dropwise addition of 1 mol alkoxyethyl alcohol in at least 1 mol of liquid phosgene, or by introducing or dropping 1 mol of phosgene in at least 2 mol of alkoxyethyl alcohol.

By alkoxyethyl alcohols of the general formula:

are meant methoxyethyl alcohol, ethoxyethyl alcohol, propoxyethyl alcohol and isopropoxyethyl alcohol. In the above formula $R_2$ has the meaning given above.

The aromatic carbamic acid derivatives for the second general process are obtained by reacting 1 mol of either phosgene or carbonic acid alkylester halide with 1 mol of a secondary amine of the general formula:

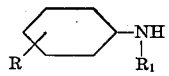

wherein R and $R_1$ have the meanings given above. As such amines can be named: N-methyl- and N-ethyl-aniline, -o-, -m-, and -p-toluidine, -o- and -p-anisidine, -asymmetric m-xylidine, -asymmetric o-xylidine, -o-, -m- and -p-chloraniline, -o-, -m- and -p-bromaniline.

The following examples serve as further illustrations of the invention. Parts are always given as parts by weight and temperatures are in degrees centigrade.

EXAMPLE 1

To form the sodium alcoholate, 92 parts of sodium are added in small portions to 32 parts of dry methoxyethyl alcohol and 44 parts of abs. benzene which are boiling under reflux and are being stirred. On completion of the reaction, the mixture is cooled and 79.1 parts of N-ethyl-N-o-tolyl-carbamic acid chloride are dropped in while cooling at 0–10°. Thereafter the mixture is boiled for 3 hours under reflux. The mixture is then cooled and then washed, first with about 100 parts 2n-hydrochloric acid and then twice with about 100 parts of water. The benzene solution is then dried with 5 parts of calcium chloride, filtered, the benzene is distilled off and the residue distilled in the vacuum. N-ethyl-N-o-tolyl-carbamic acid methoxyethyl ester passes over at 159–160° at 13 mm. pressure, or at 119–120° at 0.15 mm. pressure, and is a slightly viscous almost colourless oil.

EXAMPLE 2

15.2 parts of dry methoxyethyl alcohol are added dropwise to 20.8 parts of liquid phosgene while stirring and while cooling at 0–4°. While thoroughly stirring, the mixture is held at this temperature for a further half hour and then is allowed to rise to room temperature. On attaining room temperature, the reaction product is stirred into 50 parts of ice water, separated, and again shaken with 50 parts of water. After removing the water, the raw product is dried over 3 parts of calcium chloride, and finally, if desired, distilled. The chloroformic acid methoxyethyl ester passes over at 56° at 13 mm. pressure.

13.9 parts of chloroformic acid methoxyethyl ester are added dropwise to a mixture of 13.5 parts of N-ethyl-o-toluidine, 20 parts of dry acetone and 5.8 parts of dehydrated soda at 10–20° while stirring and under cooling. Thereafter the mixture is boiled for 2½ hours under reflux. It is then cooled, drawn off under suction and the filter cake is washed with acetone. The acetone is distilled off from the filtrate and the residue is distilled in vacuo. N-ethyl-N-o-tolyl-carbamic acid methoxyethyl ester is obtained which boils at 159–160° at 13 mm. pressure.

The following compounds are obtained in an analogous manner:

N-ethyl-N-o-tolyl-carbamic acid ethoxyethyl ester, B. P. 107–108° at 0.1 mm. pressure.

N-methyl - N - (o-chlorophenyl) - carbamic acid methoxyethyl ester, B. P. 114–115° at 0.12 mm. pressure.

N-ethyl - N - (m - chlorophenyl) - carbamic acid methoxyethyl ester B. P. 126–127° at 0.25 mm. pressure.

N-ethyl - N - (p - chlorophenyl) -carbamic acid methoxyethyl ester B. P. 133–134° at 0.3 mm. pressure.

N-ethyl - N - (o-methoxyphenyl) -carbamic acid methoxyethyl ester B. P. 114–116° at 0.06 mm. pressure.

The following compounds can also be produced according to one of the methods described in the examples:

N-methyl-N-phenyl carbamic acid methoxyethyl ester.

N-ethyl-N-phenyl carbamic acid ethoxyethyl ester.

N-methyl-N-phenyl carbamic acid ethoxyethyl ester.

N-ethyl-N-phenyl-carbamic acid methoxyethyl ester.

N-ethyl - N - (o - chlorophenyl) -carbamic acid methoxyethyl ester.

N-methyl - N - (p - chlorophenyl) -carbamic acid methoxyethyl ester.

N-ethyl-N-p-anisyl-carbamic acid methoxyethyl ester.

N-methyl-N-p-anisyl-carbamic acid methoxyethyl ester.

N-methyl-N-p-xylyl-carbamic acid methoxyethyl ester.

N-ethyl-N-p-xylyl-carbamic acid methoxyethyl ester.

N-methyl-N-phenyl-carbamic acid methoxyethyl ester.

N-ethyl-N-o-tolyl-carbamic acid-n-propoxyethyl ester.

N-ethyl-N-phenyl-carbamic acid-isopropoxyethyl ester.

N-ethyl-N-o-tolyl-carbamic acid isopropoxyethyl ester.

EXAMPLE 3

A. *Solution*

To produce an insect repellant which is particularly suitable for application on the skin but can also be applied to articles of clothing, 25 parts of N-ethyl-N-o-tolyl-carbamic acid methoxyethyl ester are dissolved in 75 parts of isopropyl alcohol. On applying the solution to the skin, protection against insect bites is obtained which lasts for several hours.

Another compound of the general formula according to this invention can be used instead of the active ingredient given above, or a part of the active ingredient can be replaced by a substance with an insect repellant quality. Such a combined preparation, for instance, can consist of 12 parts of N-ethyl-N-o-tolyl-carbamic acid-methoxyethyl ester and 12 parts of o-chlorobenzoic acid diethylamide in 76 parts of isopropyl alcohol.

B. *Emulsion*

20 parts active ingredient are mixed with 20 parts of a fatty acid ester sulphonate. On stirring this mixture into 100 parts of water, a ready-to-use emulsion is obtained.

C. *Cream*

A stearate cream is produced from 8 parts of paraffin, 15 parts stearic acid, 5 parts of wool fat, 2 parts of wax, 3 parts of glycerine, 1 part of triethanolamine, 58.5 parts of water and 0.5 part of conc. ammonia. The glycerine triethanolamine, water and ammonia are stirred into the other components which have been melted at 80°, and then the 17 parts of active ingredient are added.

The following come into question as further solvents: alcohols such as ethanol, cyclohexanol, benzylalcohol, glycerine, ester, ether and ketones such as ethyl acetate, ethoxy ethanol, propanone-2, butanone-2 or cyclohexanone; vegetable oils such as olive oil, castor oil or peanut oil; mineral or synthetic hydrocarbons such as paraffin oil, kerosene, hydrated naphthalenes and alkylated naphthalenes.

Emulsifiers of a cation active or non-iogenic type come into consideration for the production of emulsions. By applying the active ingredient on a solid pulverulent carrier and then combining with a wetting agent, concentrates for suspensions are obtained.

The choice of the above carriers and application forms depends on whether the insect repellant is intended for use chiefly on the skin of both man and animals or on textiles etc. or whether it is desired to keep whole rooms free of insects. Solutions or dispersions in materials which are gaseous under atmospheric pressure and room temperature, e. g. dichlorodifluoromethane or trichlorofluoromethane are suitable for the latter purpose. Fumigating agents containing active ingredients produced according to this invention can also serve for this purpose.

Ointment-like preparations are particularly suitable for application to the human skin. They can contain fat but also be free of fat and can be produced either with or without the addition of solid ingredients such as zinc oxide or titanium dioxide.

What we claim is:

1. A carbamic acid ester of the formula:

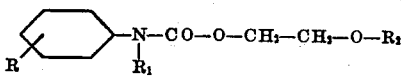

wherein

R represents a member selected from the group consisting of hydrogen, halogen, methyl and methoxy, $R_1$ represents a member selected from the group consisting of methyl and ethyl and $R_2$ represents a member selected from the group consisting of methyl, ethyl and propyl.

2. A carbamic acid ester of the formula:

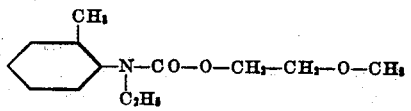

3. A carbamic acid ester of the formula:

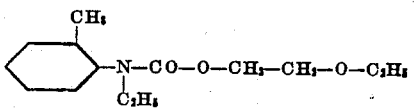

KURT ENGEL.
CHARLES J. MOREL.

REFERENCES CITED

The following references are of record in the file of this patent:

UNITED STATES PATENTS

| Number | Name | Date |
|---|---|---|
| 2,401,080 | Kilgore | May 28, 1946 |

OTHER REFERENCES

Barker et al.: J. Chem. Soc., 1949, 874–881.